United States Patent [19]
Levitan et al.

[11] Patent Number: 5,872,950
[45] Date of Patent: Feb. 16, 1999

[54] METHOD AND APPARATUS FOR MANAGING REGISTER RENAMING INCLUDING A WRAPAROUND ARRAY AND AN INDICATION OF RENAME ENTRY AGES

[75] Inventors: David Stephen Levitan; John Stephen Muhich, both of Austin, Tex.

[73] Assignee: International Business Machines Corporation, Armonk, N.Y.

[21] Appl. No.: 829,670

[22] Filed: Mar. 31, 1997

[51] Int. Cl.[6] .................................................. G06F 9/38
[52] U.S. Cl. ......................................... 395/393; 395/394
[58] Field of Search ................................... 395/392, 393, 395/394, 395, 586, 800.23

[56] References Cited

U.S. PATENT DOCUMENTS

| | | | |
|---|---|---|---|
| 5,490,280 | 2/1996 | Gupta et al. ........................ | 395/800.23 |
| 5,584,038 | 12/1996 | Papworth et al. .................. | 395/800.23 |
| 5,590,352 | 12/1996 | Zuraski, Jr. et al. .............. | 395/800.23 |
| 5,606,670 | 2/1997 | Abramson et al. ................. | 711/154 |
| 5,699,537 | 12/1997 | Sharangpani et al. ............. | 395/393 |

Primary Examiner—Parshotam S. Lall
Assistant Examiner—Viet Vu
Attorney, Agent, or Firm—Anthony U.S. England; Raymond M. Galasso

[57] ABSTRACT

A method and apparatus for managing register renaming in an information handling system that supports out-of-order and speculative instruction execution. Register entries are stored in architected registers, and rename entries are stored in rename registers. Register and rename entries are transferred between the rename and architected registers in response to dispatch of instructions or upon the occurrence of a canceling event, such as a mispredicted branch instruction or an interrupt condition. Rename entries are stored in the rename registers in a round robin fashion and tagged by age. Age order of the rename entries is determined without keeping the rename entries in age order through the method of shifting rename entries to the next rename register each time a rename entry is removed from a rename register. By eliminating shifting of rename entries to maintain age order, a power savings is realized.

4 Claims, 2 Drawing Sheets

METHOD AND APPARATUS FOR MANAGING REGISTER RENAMING INCLUDING A WRAPAROUND ARRAY AND AN INDICATION OF RENAME ENTRY AGES

TECHNICAL FIELD OF THE INVENTION

The present invention relates to a method and apparatus in an information handing system that supports out-of-order and speculative instruction execution, for managing register renaming in response to dispatch of instructions or upon the occurrence of a canceling event, such as an interrupt condition or a mispredicted branch instruction.

BACKGROUND OF THE INVENTION

The design of a typical computer or information handling system requires the establishment of a fixed number of addressable registers, such as general purpose registers (GPRs), condition registers (CRs), and floating point registers (FPRs) for the programmer to use in designing programs for the information handling system.

The design of computers and computer programs is based on the assumption that computer or information handling system program instructions are executed by the information handling system in the order in which they are written in the program and loaded into the information handling system. While instructions must logically appear to the information handling system to have been executed in program order, it has been learned in an effort to improve computer performance that some instructions do not have to be physically performed in program order, provided that certain dependencies do not exist with other instructions. Further, if some instructions are executed out of order, and one of such instructions is a branch instruction, wherein a branch prediction is made to select the subsequent instruction sequence, a need to restore the registers affected by instructions in the predicted branch to their original values can occur if the branch is mispredicted. In such a case, the information handling system is restored to the condition before the branch was taken. The process of efficiently executing instructions out of order requires that values for registers prior to the predicted branch be maintained for registers affected by the instructions following the branch, while provision is made to contingently store new values for registers affected by instructions following the predicted branch. When branch instructions are resolved, the contingency of the new register values is removed, and the new values become the established values for the registers. The above-described register management technique is referred to as register renaming. For an example of a register management system utilizing register renaming techniques, see U.S. Pat. No. 5,134,561, of common assignee herewith.

Register renaming may also be needed upon the occurrence of an interrupt condition such as for overflow conditions or page faults and the like.

There are two basic approaches to register renaming. The first approach is referred to as the future file approach. In this approach, all updates to a value stored in an architected register are stored or assigned to future file entries in a rename queue or register until the data is available and the instruction that is causing this update is committed or becomes non-speculative. When the instruction is committed, the update in the oldest future file entry assigned to the architected register is written to the architected register.

Thus, the rename queues or registers contain the speculative update values for the architected registers, and the architected registers contain the non-speculative values for the architected registers. An instruction which reads the value of an architected register first determines if any future file entries have been assigned to that architected register in the rename registers. If no future file entries have been assigned, the instruction reads the value in the architected register. If one or more future file entries have been assigned, the instruction reads the value from one of the rename registers.

The second register renaming approach is referred to as the history file approach. With this approach, the architected registers contain the speculative update values for the architected register, and the rename registers contain the values of the architected registers prior to being speculatively updated. Thus, an instruction which reads the value of an architected register simply reads the speculative value in the architected register.

Upon the occurrence of an interrupt or a mispredicted branch instruction, non-speculative values for the architected registers must be determined. With the future file approach, the non-speculative values for the architected registers would be stored in the architected registers themselves, whereas with the history file approach, the non-speculative values for the architected registers would be stored in the rename registers.

Thus, upon the occurrence of an interrupt or a mispredicted branch instruction, the age order of a value stored in the rename register is critical to determining the non-speculative values of the architected registers in the history file approach. Prior art rename registers used in the history file approach utilized shift registers which shift each history file entry down as an entry is removed from the rename registers as a result of being retired or written to an architected register to restore the architected register with a non-speculative value existing prior to the interrupt or mispredicted branch instruction. By using a shift-down register array for the rename registers, the history file entries remain in age order. The problem with this age order shift register approach is the excessive power required for the shifting.

What is needed is a register renaming approach which eliminates the need for shift rename registers to save power while minimizing the complexity required to track the age order of values stored in the rename registers.

SUMMARY OF THE INVENTION

Accordingly, the present invention provides an information handling system for managing registers comprising at least one processor having at least one execution unit for executing instructions, a plurality of architected registers for storing register entries, and a rename register array for storing rename entries. The system further comprises a transfer mechanism for transferring the register or rename entries between the rename register array and the architected registers in response to the relative age of the rename entries. The rename register array is a wraparound array. The system further includes means for determining the relative age of rename entries stored in the wraparound array.

The present invention also provides a method for managing registers in an information handling system including at least one processor having at least one execution unit for executing instructions. The method comprising the steps of storing register entries in a plurality of architected registers; storing rename entries in a rename register array wherein the rename register array is a wraparound array; transferring the register or rename entries between the rename register array and the architected registers in response to the relative age of the rename entries; and determining the relative age of rename entries stored in the wraparound array.

The present invention provides the advantage of an improved information handling system and method for managing registers.

The present invention also provides the advantage of saving power used in prior art register renaming systems which utilize rename shift registers for keeping rename entries in age order.

The present invention also provides the advantage of avoiding the complexity of controlling and keeping track of the age of all rename register entries.

DETAILED DESCRIPTION OF A PREFERRED EMBODIMENT OF THE INVENTION

Figure 1:
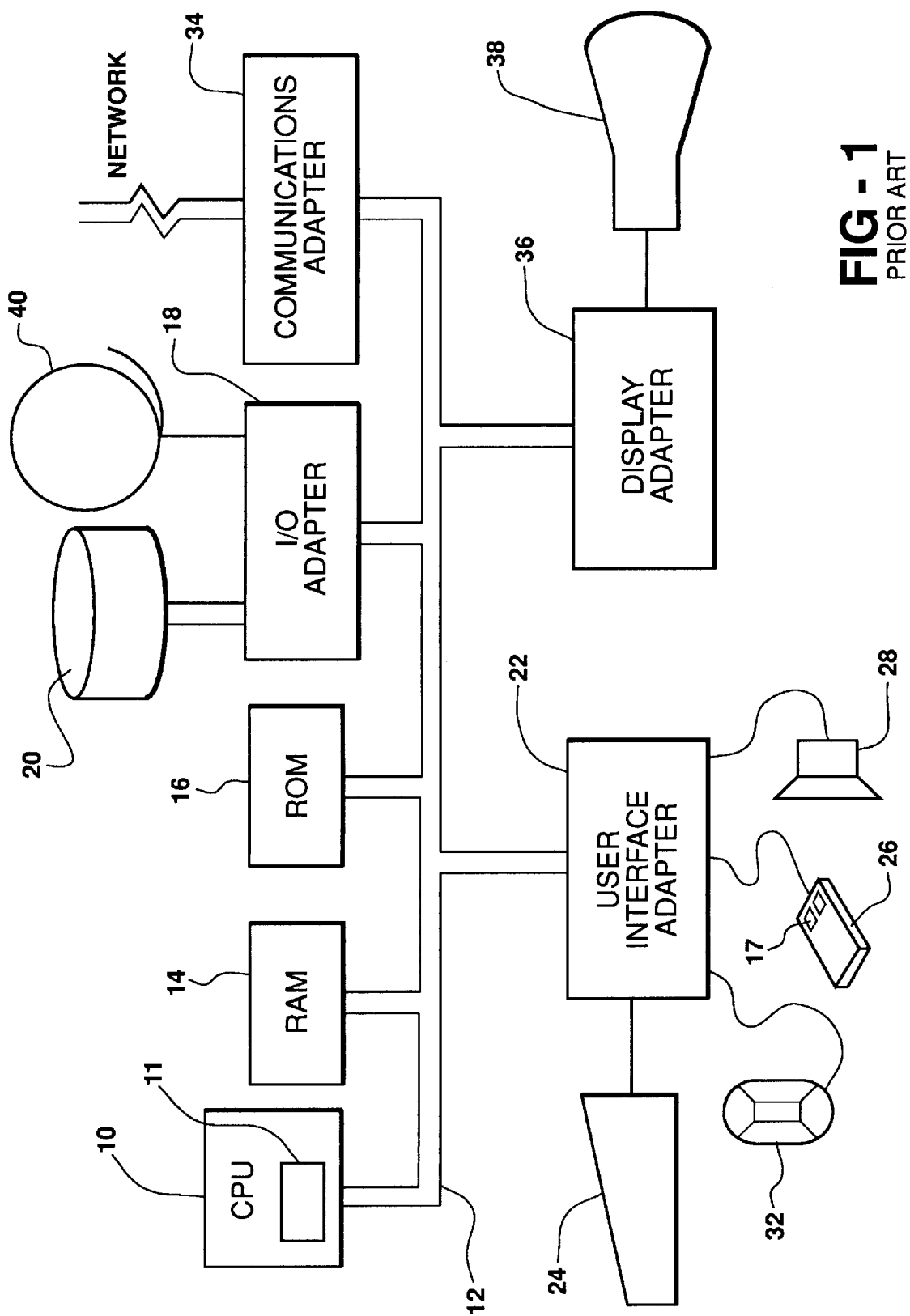
FIG. 1 illustrates an information handling system embodying the present invention.

Referring to FIG. 1, a representative hardware environment for practicing the present invention is depicted. The information handling system includes at least one processor or central processing unit (CPU) 10 with one or more integrated execution units 11 for executing instructions dispatched to the execution units 11, one or more levels of cache memory (not shown), and a number of other units, such as a memory management unit (not shown). CPU 10 is interconnected via system bus 12 to random access memory (RAM) 14, read-only memory (ROM) 16, and input/output (I/O) adapter 18 for connecting peripheral devices such as disc units 20 and tape drives 40 to bus 12, user interface adapter 22 for connecting keyboard 24, mouse 26 having a button 17, speaker 28, microphone 32, and/or other user interface devices such as a touch screen device (not shown) to bus 12, communication adapter 34 for connecting the information handling system to a data processing network, and display adapter 36 for connecting bus 12 to display device 38.

The present invention is preferably implemented in and as part of CPU 10. The internal components and operation of CPUs are known to those skilled in the art, and therefore, the details of such will not be explained to any greater extent than necessary for understanding and appreciating the underlying concepts of the present invention.

Generally, the present invention provides a method and apparatus for managing register renaming in an information handling system that supports out-of-order and speculative instruction execution. Register renaming is used to extend the apparent or virtual size of architected registers in an information handling system by transferring entries between the architected registers and rename registers. The register renaming management method and apparatus of the present invention utilizes rename registers which are arranged in a wraparound array or circular queue fashion, and an allocation pointer which assigns new rename entries to the rename registers in a round robin fashion.

The method and apparatus of the present invention keeps track of the age order of the rename entries without keeping the rename entries in age order through the method of shifting rename entries to the next rename register each time a rename entry is removed from a rename register. With such a method and apparatus, the present invention substantially reduces the power used to manage register renaming as compared to prior art methods and apparatuses while minimizing the overall complexity required to keep track of the age order of rename entries.

The present invention can be more fully described with reference to FIG. 2. It is to be understood that the method and apparatus for managing register renaming in the present invention is equally applicable to all register renaming techniques including, but not limited to, the future file approach and history file approach to renaming. Thus, although the following description of the preferred embodiment describes register renaming management wherein the history file renaming approach is utilized, the present invention is not limited in scope to history file type renaming. It is also to be understood that the register renaming management method and apparatus of the present invention is not dependent upon the overall computer or information handling system architecture and may be implemented in a variety of environments.

Figure 2:
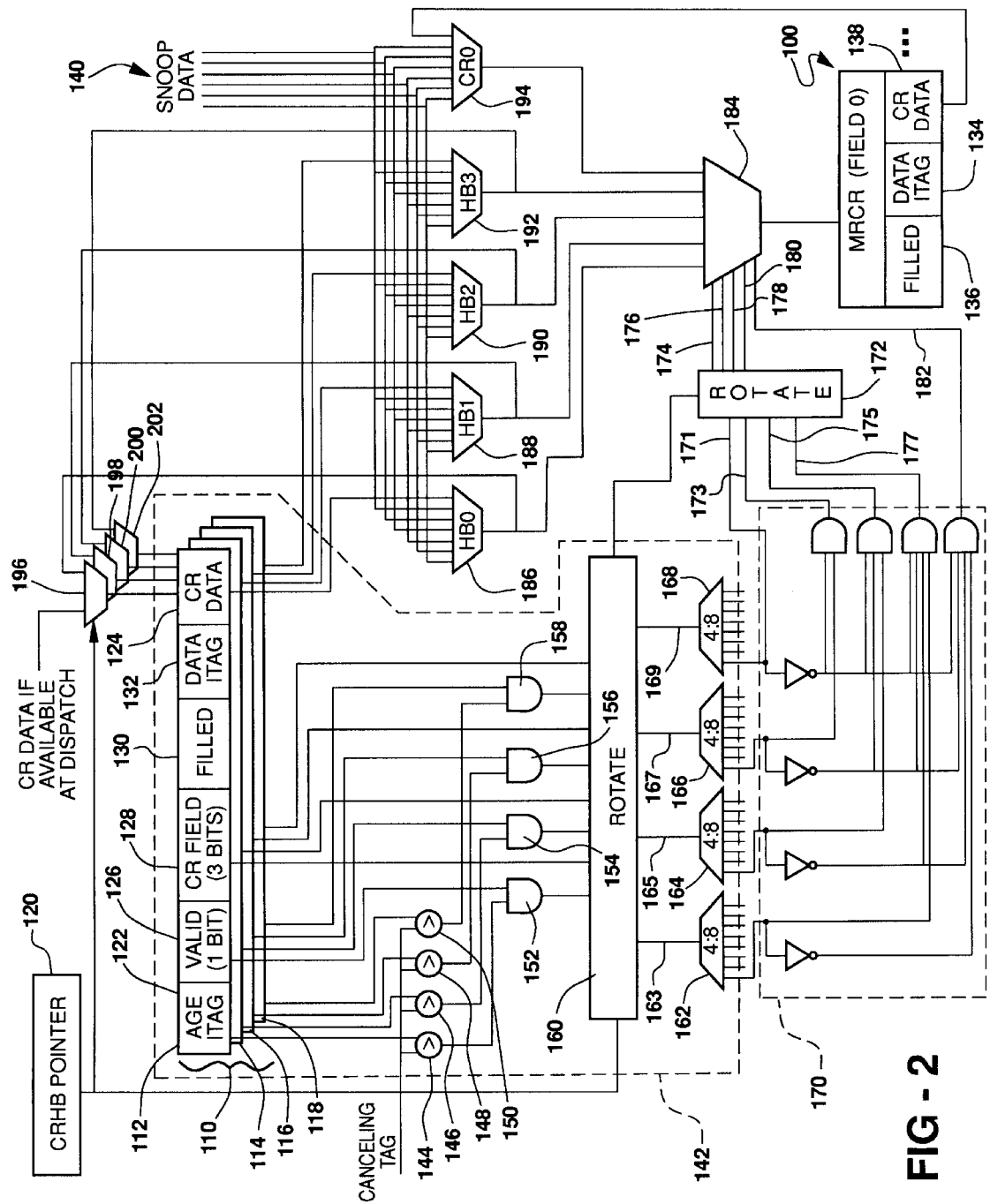
FIG. 2 is a block diagram illustrating the present invention.

FIG. 2 illustrates a register renaming management system for a computer or information handling system having an architectural design requirement of a specified plurality of addressable (logical) architected registers such as general purpose registers, floating point registers, or condition registers. FIG. 2 illustrates an architected condition register array 100 having 8 fields of condition registers (CRs). However, it will be appreciated that any number of CR fields may be used within the scope of the present invention.

It will be appreciated that the present invention applies to any type and number of architected registers. The present invention further includes a rename register array 110 which may also be referred to as conditional register history buffers (CRHBs) having a first rename register 112, a second rename register 114, a third rename register 116, and a last rename register 118. It will be appreciated that any number of rename registers may be utilized in the present invention.

Whereas architected conditional register array 100 stores register entries, the rename registers in rename register array 112 store rename entries. Rename register array 110 is provided to fulfill the functions of architected registers in register array 100 by transferring the register or rename entries between rename register array 110 and architected register array 100. Rename registers 112, 114, 116, and 118 of rename register array 110 are configured in a wraparound array or circular queue fashion such that rename entries are stored in rename registers 112, 114, 116, 118 in a round robin fashion. Specifically, rename entries are stored in rename register array 110 in sequential order from the first rename register 112 to the last rename register 118 and back to the first rename register 112. A CRHB pointer 120 assigns a rename entry to the first available, i.e., empty or not filled, rename register 112, 114, 116, 118 in the sequential order described above.

When an instruction gets dispatched from an instruction dispatch buffer (not shown) to one of the execution units in information handling system for execution, if the instruction updates one of the fields in conditional register array 100, then an age tag 122 associated with the instruction that is getting dispatched is stored, as a rename entry, into the next available CRHB 112, 114, 116, or 118 along with corresponding CR data 124 and a valid bit 126. Valid bit 126 indicates whether a rename entry is valid, i.e., contains valid CR data 124. Each rename entry also includes a CR field of three bits 128 which indicates to which field or condition register of the condition register array 100 the rename entry is assigned.

Each rename entry also includes a filled field 130 comprising a filled flag or bit which indicates whether CR data 124 is earmarked for a condition register array 100 that is pending or waiting to be updated. If the fill flag is off, a data tag 132 in the rename entry will contain the instruction tag (ITAG) of the instruction that will set the CR that is pending. Thus, age tag 122 is the instruction tag (ITAG) of the instruction that created the history buffer rename entry, whereas data tag 132 is the instruction tag (ITAG) of the instruction that will set the CR that is pending. Thus, age tag 122 can be used to determine the relative age of a rename entry vis-a-vis other rename entries.

When an instruction which modifies a field in array 100 is dispatched, it sets a register or field in array 100 with the instruction tag of the instruction being dispatched, i.e., a data tag 134 of the field will contain the instruction tag of the instruction that will set the pending field. In addition to data tag 134, each field or register of architected condition register array 100 also includes a filled field 136 comprising a filled flag or bit and a CR data field 138 similar to that of each rename entry in CRHB rename registers 112, 114, 116, and 118. If the filled flag is on, as indicated in filled field 136, the field or register of condition register array 100 is filled and will not accept any CR data. If the filled flag is off, as indicated by the filled field 136, the field or register of architected condition register array 100 will accept CR data from an execution unit which has executed an instruction having the identical instruction tag as stored in data tag 134.

The CR data from CR data field 138, plus any additional updates that are occurring that cycle, are fed into newly created CRHB rename entries, at which point the age tag 122 of the CRHB rename entry is filled in with the instruction tag of the CR modifying instruction that is getting dispatched. The CRHB pointer 120 is then incremented, causing the history buffer rename entries to be assigned in order. If the rename register array 110 is full, then no new instructions that modify a CR will be allowed to dispatch. When a rename entry has been written to last rename register 118 and the first rename register 112 is available for reuse, the write operation controlled by CRHB pointer 120 wraps back to the first rename register 112.

At this point, it is important to recall that the concept behind a history file type rename is that if an instruction that modifies a register is dispatched, the data for that register is copied into the history file, i.e., one of the rename registers as a rename entry. If the instruction that modifies that register is canceled, such as upon the occurrence of an interrupt condition or a mispredicted branch instruction, then the data from the rename entry in the history file or rename register is copied back to the architected register. If multiple updates are allowed to the same register, then the rename register array needs to accept data from the instruction that will be setting that register, i.e., the filled field 130 flag will be off. Multiple updates to the same register requires tracking of the instruction that will be setting that register.

One way of updating the pending register update is to keep track of the instruction tag of the instruction that will be setting that register. When an execution unit in the information handling system has data to set into an architected register, it reports its data and the instruction tag of the instruction causing the register update on a snoop data bus 140. In FIG. 2, snoop data bus 140 comprises a total of six snoop lines. Snoop bus 140 is coupled to the execution units that calculate the CR results. All registers, including architected registers and rename registers, that are waiting for data have the instruction tag of the instruction that will be setting their register in data tag 132 or data tag 134. If the instruction tag that an execution unit sets on snoop data bus 140 is the same instruction tag that a register is waiting for, then the data will be captured into that particular register. It is important to note that age tag 122 identifies the relative age of each rename entry in rename register array 110.

If multiple rename entries are pending to the same physical or architected register and a canceling event, such as an interrupt condition or a mispredicted branch condition, occurs that is older than two or more of the history rename entries, then logic block 142 determines which history rename entries need to be restored. In general, the newest history file rename entry that is older than the canceling event must be restored to the architected register. For a history file type rename, the instruction tag of the interrupting or mispredicted instruction is supplied as an input to logic block 142 and used to determine which of the history file rename entries are used to restore.

For future file type renames, the instruction tag and the instruction that wishes to access the future file rename entries is supplied and used to determine which entry in the future file rename buffers or registers should be accessed.

The instruction tag of the instruction that indicates the interrupt or branch wrong point, i.e., the canceling tag, is compared using comparators 144, 146, 148, 150 against all of the ITAGs in age tag field 122 of history file array 110 to determine which history file rename entries are for instructions before the canceling event and are thus candidates for the restore function. The outputs of comparators 144, 146, 148, 150 are inputted to AND gates 152, 154, 156, 158 as shown. Valid bits 126 of rename registers 112, 114, 116, 118 are inputted to AND gates 152, 154, 156, 158, respectively, as shown. If there are multiple history file rename entries for the same register that are candidates for the restore, then the rename entry corresponding to the newest or youngest dispatched instruction in the candidate set is selected for restore. To determine which is the newest one cannot be determined by the position within the history file, since the history file is allowed to wrap. According to the invention some of the control information, namely, the outputs of AND gates 152, 154, 156, 158 and the CR field bits 128 of the rename entry candidates, in rename register array 110 is rotated from sequential order, i.e., the physical order of the control information in rename register array 110, to age order. A first rotation device 160 is provided to perform the rotation of the control information. The outputs of AND gates 152, 154, 156, 158 and CR field bits 128 are inputted to rotation device 160. Thus, a logic 1 is inputted to rotation device 160 along with CR field bits 128 if the age tag 122 of the corresponding rename entry occurred before the canceling event, resulting in a logic 1 at the output of comparators 144, 146, 148 or 150, and the valid bit of the corresponding rename entry is a logic 1. Thus, a set of four bits comprising the one bit output for AND gates 152, 154, 156, or 158 and the 3-bit CR field 128 is inputted to rotation device 160. Rotation device 160 also includes an input for CRHB pointer 120 for determining the amount of rotation necessary for each set of four bits corresponding to a rename entry. Thus, outputs 163, 165, 167, and 169 of rotation device 160 are four sets of four bits corresponding to each of the rename entries arranged in age order, i.e., output 163 corresponds to the oldest dispatched instruction in the rename register array 110, and output 165 corresponds to the next oldest dispatched instruction in the rename register array 110, and so on. Thus, output 169 corresponds to the youngest dispatched instruction in the rename register array 110. The outputs 163, 165, 167, and 169 of rotation device 160 are inputted into decoders 162, 164, 166, 168. Decoders 162, 164, 166, 168 are 4-bit to 8-bit decoders.

Decoder 162 inputs output 163 and turns on none of the outputs of the decoder if the bit outputted from AND gate 152 is off. This indicates that the particular HB entry corresponding to output 163 is not a valid entry (i.e., it has been deallocated) or it is not older than the canceling instruction and, therefore, is not needed for restoring a register. If the bit outputted from AND gate 152 is on, then one of the 8 output bits of decoder 162 is turned on as determined by the 3 bits of CR field 128 outputted from output 163 and inputted to decoder 162. Decoders 164, 166, and 168 operate in a similar fashion as decoder 162. Thus, for example, if bit 0 of decoder 162 output is on, this indicates that CR 0 is a destination operand of the instruction stored as the oldest entry in the rename array 110, that the instruction was dispatched prior to the canceling instruction, and that the entry is valid. And, for example, if bit 2 of decoder 164 is on, this indicates that CR 2 is a destination operand of the instruction stored as the second oldest entry in the array 110, that the instruction was dispatched prior to the canceling instruction, etc.

Summarizing what has been thus far described, on a branch misprediction or interrupt, a canceling ITAG is supplied to logic block 142 as shown that allows determination of which instructions occur before the canceling event and, thus, are candidates for restore into the register of register array 100. The control information that identifies if a rename entry was created by an instruction which was dispatched before the canceling event is shifted or rotated by first rotation device 160 from oldest rename entry corresponding to output 163 to newest rename entry corresponding to output 169. The corresponding outputs of decoders 162, 164, 166, and 168 indicate CRs which are candidates for restoring from the rename entries. That is, if a decoder has one of its 8 bits on, then the corresponding one of the 8 CRs is a candidate to be restored from the rename register corresponding to that encoder.

If the outputs of more than one decoder indicate the same CR as a candidate to be restored, all of such outputs will be communicated to the same priority encoder. The outputs 171, 173, 175, 177 from such a priority encoder 170 indicate which (if any) of the CRHB rename entries should be restored into register array 100. FIG. 2 only shows CR field or register 0 (i.e., register 0) of register array 100. The other 7 CR fields or registers of register array 100 are identical but use the other 7 outputs of the 4:8 decoders. Thus, only one decoder output for each decoder 162, 164, 166, 168 is shown coupled to a priority encoder 170. Although not shown, each decoder output would be coupled to a different priority encoder.

Referring now to the priority encoder 170 for CR 0 shown in FIG. 2, outputs 171, 173, 175, 177 must be rotated, since these outputs are arranged in age order as opposed to the physical order of the rename entries in the CRHB or rename register array 100. To get outputs 171, 173, 175, 177 from indicating age order back to indicating physical order involves a rotation of outputs 171, 173, 175, 177 by a second rotation device 172 based on the CRHB pointer 120 information passed through rotation device 160.

In response to all the inputs to priority encoder 170 being off (i.e., having a "0" logic state), a separate output 182 from priority encoder 170 indicates that a restore or rename was not necessary and that the CR data 138 will come directly from snoop data bus 140. Output 182 bypasses second rotation device 172.

Rotation device 172 outputs 174, 176, 178, 180, and 182 are inputted as select inputs to select multiplexor 184. It will be noted that there is one second rotation device 172 and one multiplexor corresponding to each field or register of array 100.

History buffer multiplexors 186, 188, 190, and 192 and field 0 multiplexor 194 provide the inputs to select multiplexor 184. The CR data field 124 of rename registers 112, 114, 116, and 118 are inputted into history buffer multiplexors 186, 188, 190, and 192, respectively. The six lines of snoop data bus 140 are also inputted into history buffer multiplexors 186, 188, 190, and 192 and field 0 multiplexor 194. CR data field 138 is inputted to field 0 multiplexor 194. It is to be noted that there is a multiplexor similar to field 0 multiplexor 194 for each field, and the CR data field for each field is input thereto. The outputs of history buffer multiplexors 186, 188, 190, and 192 are coupled to assignment multiplexors 196, 198, 200, 202, respectively. Assignment multiplexors 196, 198, 200, 202 and CRHB pointer 120 are used to assign CR data to CR data field 124 to the next available (i.e., empty) rename entry in rename register array 110.

Although the present invention and its advantages have been described in detail, it should be understood that various changes, substitutions and alterations can be made herein without departing from the spirit or scope of the invention as defined in the appended claims.

What is claimed is:

1. An information handling system for managing registers comprising:

a) at least one processor having at least one execution unit for executing instructions;

b) a plurality of architected registers for storing register entries;

c) a rename register array for storing rename entries, wherein said rename register array includes a wrap-around array;

d) means for transferring said rename entries from said rename register array to said architected registers; and e) control means for controlling said transferring, wherein the control means comprises:

i) means for determining relative ages of rename entries stored in said rename register array;

ii) comparator means for comparing ages of said rename entries to an age of a canceling event, to determine a candidate set of rename entries which are younger than said canceling event;

iii) first rotation means, operably associated with said rename register array, for ordering identifiers for the rename entries in said candidate set, from a sequential order to said age order;

iv) decoder means, operably associated with said first rotation means, for decoding said identifiers to determine which ones of the rename registers are associated with which of the respective architected registers; and v) priority encoder means, operably associated with said decoder means and said architected registers, for outputting select signal bits in said age order, to select which one of the rename entries, from among the candidate set of rename registers, to transfer to each of the respective architected registers, responsive to said canceling event.

2. A method for managing registers in an information handling system including at least one processor having at least one execution unit for executing instructions, said method comprising the steps of;
  a) storing register entries in architected registers;
  b) storing rename entries in a rename register array, wherein said rename register array includes a wraparound array;
  c) transferring said rename entries from said rename register array to said architected registers in response to the steps of:
    i) determining relative ages of said rename entries stored in said wraparound array;
    ii) comparing said relative ages of said rename entries to an age of a canceling event to determine a candidate set of rename entries which are younger than said canceling event;
    iii) ordering identifiers for the rename entries in said candidate set, from a sequential order to said age order;
    iv) decoding said identifiers to determine which ones of the rename registers are associated with which of the respective architected registers; and
    v) encoding select signal bits in said age order, for selecting which one of the rename entries, from among the candidate set of rename registers, to transfer to each of the respective architected registers, responsive to said canceling event.

3. The information handling system, as recited in claim 1, further comprising second rotation means operably associated with said rename register array and each of said priority encoder means for ordering said select signal bits from said age order of said rename entries to said sequential order of said rename register array.

4. The method, as recited in claim 2, further comprising the step of ordering said select signal bits from said age order of said rename entries to said sequential order of said rename register array.

\* \* \* \* \*